US009769486B2

United States Patent
Iwasaki

(10) Patent No.: US 9,769,486 B2
(45) Date of Patent: Sep. 19, 2017

(54) INFORMATION PROCESSING APPARATUS, METHOD OF CONTROLLING THE SAME, AND STORAGE MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/868,871

(22) Filed: Sep. 29, 2015

(65) Prior Publication Data

US 2016/0029032 A1    Jan. 28, 2016

Related U.S. Application Data

(63) Continuation of application No. PCT/JP2013/002501, filed on Apr. 12, 2013.

(51) Int. Cl.
*G06T 1/00* (2006.01)
*H04N 19/436* (2014.01)
(Continued)

(52) U.S. Cl.
CPC ............ *H04N 19/436* (2014.11); *G06T 1/20* (2013.01); *H04N 19/42* (2014.11); *H04N 19/645* (2014.11)

(58) Field of Classification Search
None
See application file for complete search history.

(56) References Cited

U.S. PATENT DOCUMENTS 5,847,762 A    12/1998 Canfield et al.
6,577,681 B1    6/2003 Kimura
(Continued)

FOREIGN PATENT DOCUMENTS

EP    0782345    7/1997
EP    2192780    6/2010
(Continued)

OTHER PUBLICATIONS

Parallel Zigzag Scanning and Huffman Coding for a GPU-Based MPEG-2 Encoder. Pablo Montero, Javier Taibo, V'ictor Gul'ias and Samuel Rivas. 2010.*
(Continued)

*Primary Examiner* — Delomia L Gilliard
(74) *Attorney, Agent, or Firm* — Greenblum & Bernstein, P.L.C.

(57) ABSTRACT

In an information processing apparatus, a GPU obtains a plurality of blocks which have a predetermined number of pixels and are obtained by dividing an encoding target image, and intermediate blocks for which a spatial redundancy is removed are generated for each block. The GPU analyzes a data string of the intermediate blocks, and generates specifying information for specifying positions of data for which a value is included in a predetermined range in the data string, and for each of the blocks, outputs at least a portion of the data of the intermediate blocks, and corresponding specifying information to a storage apparatus. A CPU, for each of the plurality of blocks, executes compression processing by referencing corresponding specifying information, and reading at least a portion of the data corresponding to the specifying information from the storage apparatus.

13 Claims, 5 Drawing Sheets

(51) Int. Cl.
*H04N 19/42* (2014.01)
*H04N 19/645* (2014.01)
*G06T 1/20* (2006.01)

(56) References Cited

U.S. PATENT DOCUMENTS

| | | | |
|---|---|---|---|
| 8,194,736 | B2 | 6/2012 | Youn |
| 2006/0143615 | A1 | 6/2006 | Kondo et al. |
| 2008/0291209 | A1 | 11/2008 | Sureka et al. |
| 2009/0257485 | A1* | 10/2009 | Youn .................. H04N 19/176 375/240.01 |
| 2010/0135418 | A1 | 6/2010 | Zhang et al. |
| 2011/0268192 | A1 | 11/2011 | Moriyoshi |
| 2012/0026394 | A1* | 2/2012 | Maruyama ............. H04N 19/14 348/465 |
| 2013/0021350 | A1* | 1/2013 | Schmit ................ H04N 19/436 345/506 |

FOREIGN PATENT DOCUMENTS

| | | |
|---|---|---|
| JP | H09-214981 | 8/1997 |
| JP | 2000-92330 | 3/2000 |
| JP | 2002-112266 | 4/2002 |
| JP | 2003-101793 | 4/2003 |
| JP | 2003-125403 | 4/2003 |
| JP | 2003-224851 | 8/2003 |
| JP | 2005-151017 | 6/2005 |
| JP | 2005-295075 | 10/2005 |
| JP | 2006-186911 | 7/2006 |
| JP | 2009-017535 | 1/2009 |
| JP | 2009-260977 | 11/2009 |
| JP | 2010-130696 | 6/2010 |
| JP | 2010-161542 | 7/2010 |

OTHER PUBLICATIONS

Search Report from. PCT/JP2013/002501, mail date Jun. 11, 2013.
Extended European Search Report in the European Patent Application No. 13882024.6, mail date Oct. 11, 2016.
Pablo Montero et al.: "Parallel Zigzag Scanning and Huffman Coding for a GPU-based MPEG-2 Encoder", IEEE International Symposium on Multimedia, XP031854119, ISBN:978-1-4244-8672-4, Dec. 13, 2010, pp. 97-104.
Leiwen Wu et al.: "CUDA WUDA SHUDA: CUDA Compression Project", CS315A: Final Project, XP055012603, Retrieved from the Internet: URL: http://ppl.stanford.edu/cs315a/pub/Main/CS315a/CUDA_Compression_Final_Report.pdf[retrieved on Nov. 21, 2011], Mar. 17, 2009, pp. 1-11.
Nagai-Man Cheung et al.: "Video Coding on Multicore Graphics Processors", IEEE Signal Processing Magazine, vol. 27, No. 2, XP011306064, ISSN: 1053-5888, Mar. 1, 2010, pp. 79-89.
Budagavi (TI) M et al.: "Video coding technology proposal by Texas Instruments (and MIT)", 1.JCT-VC Meeting; Apr. 15, 2010-Apr. 23, 2010; Dresden, URL:http://wftp3.itu.int/av-arch/jctvc-site/, no. JCTVC-A101, XP030007527, ISSN: 0000-0049, Apr. 16, 2010.
Japanese Office Action in the Japanese Patent Application No. 2015-510959 dated Dec. 2, 2016 along with a partial English translation.

* cited by examiner

F I G. 5
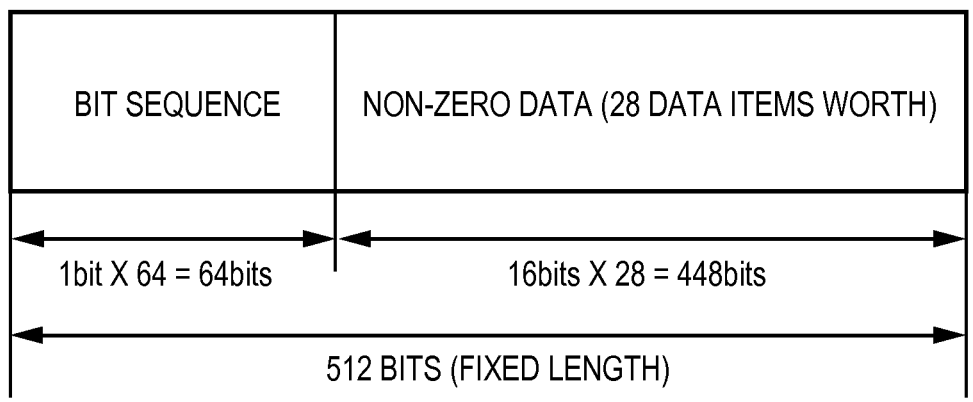

INFORMATION PROCESSING APPARATUS, METHOD OF CONTROLLING THE SAME, AND STORAGE MEDIUM

This application is a continuation of International Patent Application No. PCT/JP2013/002501 filed on Apr. 12, 2013, the entire content of which is incorporated herein by reference.

TECHNICAL FIELD

The present invention relates to an information processing apparatus, a method of controlling the same, and a storage medium, and in particular relates to an encoding technology using a CPU and a GPU.

BACKGROUND ART

In recent years, in a field of moving image distribution using a network such as the Internet, not just distribution of moving image data that is encoded in advance, but also encoding generated moving image frames in real-time, and distributing obtained moving image data is being performed.

One type of content for which encoding is performed in real-time and moving image data is distributed in this way is game content for which game screens are provided via a network. A moving image distribution server can encode game screens that a GPU generated in accordance with a predetermined an encoding format, and provide game screens that are displayed on a client device by distributing them as moving image data.

There are GPUs that comprise many arithmetic cores compared to CPUs, and that are specialized for parallel processing. Within encoding techniques, there are those that focus on GPU parallel processing performance, and perform encoding using a GPU (patent document 1).

CITATION LIST

Patent Literature

PTL1: Japanese Patent Laid-Open No. 2009-017535

SUMMARY OF INVENTION

Technical Problem

On one hand, because GPUs comprise many arithmetic cores, the processing capabilities of each of the arithmetic cores are limited compared to CPUs. More specifically, instruction sets prepared in advance differ between CPUs and GPUs. For example, in the case where a computation is performed to count bits whose value is 1 from a bit sequence of 32 bits, for example, typically it is possible to achieve a desired calculation result by a GPU executing processing by repeatedly issuing a simple instruction designating the bits in order, whereas a CPU simply executes an instruction set prepared in advance. In other words, while GPUs are specialized for parallel processing, there are many instruction issuances that are required to execute processing, and depending on the processing content, there are cases in which time is required before a result can be obtained.

The above described patent document 1 simply executes encoding processing by a GPU, and is not something that performs distribution processing considering these kinds of characteristics of GPUs and CPUs.

The present invention was conceived in view of the above described problem, and an object of the present invention is to provide an information processing apparatus, a method of controlling the same, and a storage medium that optimize encoding processing by using a CPU and a GPU.

Solution to Problem

In order to achieve the previously described object, an information processing apparatus of the present invention has a feature of having the following configuration. More specifically, an information processing apparatus has a central processing unit (a CPU) and a graphics processing unit (a GPU), and is operable to encode an image, wherein the GPU comprises: an obtainer which is able to obtain a plurality of blocks having a predetermined number of pixels obtained by dividing an encoding target image; a remover which is able to generate an intermediate block for which a spatial redundancy is removed for each of the plurality of blocks obtained by the obtainer; an analyzer which is able to analyze a data string of intermediate blocks generated by the remover, and generate specifying information for specifying a position of data for which a value is included in a predetermined range in the data string; and an outputter which is able to output, for each of the plurality of blocks, at least a portion of data of the respective intermediate block and the specifying information which corresponds to the respective intermediate block to a storage unit, and the CPU comprises: a reader which is read, for each of the plurality of blocks, the corresponding specifying information from the storage unit; and a compressor which is able to execute compression processing, by referencing the specifying information read by the reader and read the at least a portion of the data corresponding to the specifying information from the storage unit, wherein for each of the intermediate blocks, in a case where a number of data items that are included in a data string and for which a value is included in the predetermined range is larger than a predetermined number, the analyzer generates the specifying information for a new data string obtained by dividing a value that each data item of the data string indicates by a predetermined value, and the outputter orders in a data string order, and outputs as the at least a portion of the data, only data that is included in the new data string and for which a value is included in the predetermined range.

Advantageous Effects of Invention

By virtue of this configuration, it is possible by the present invention to optimize encoding processing by using a CPU and a GPU.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a view for illustrating a data configuration of data for outputting that is generated by the data generation processing according to embodiments of the present invention.

DESCRIPTION OF EMBODIMENTS

Embodiments

Exemplary embodiments of the present invention will be described hereinafter in detail, with reference to the accompanying drawings. Note that an embodiment explained below is an explanation of an example in which the present invention is applied a PC, as an example of an information processing apparatus, that comprises a CPU and a GPU, and performs encoding processing. However, the present invention can be applied to any device comprising a CPU and a GPU, and capable of performing encoding processing using them.

<Configuration of PC 100>

Figure 1:
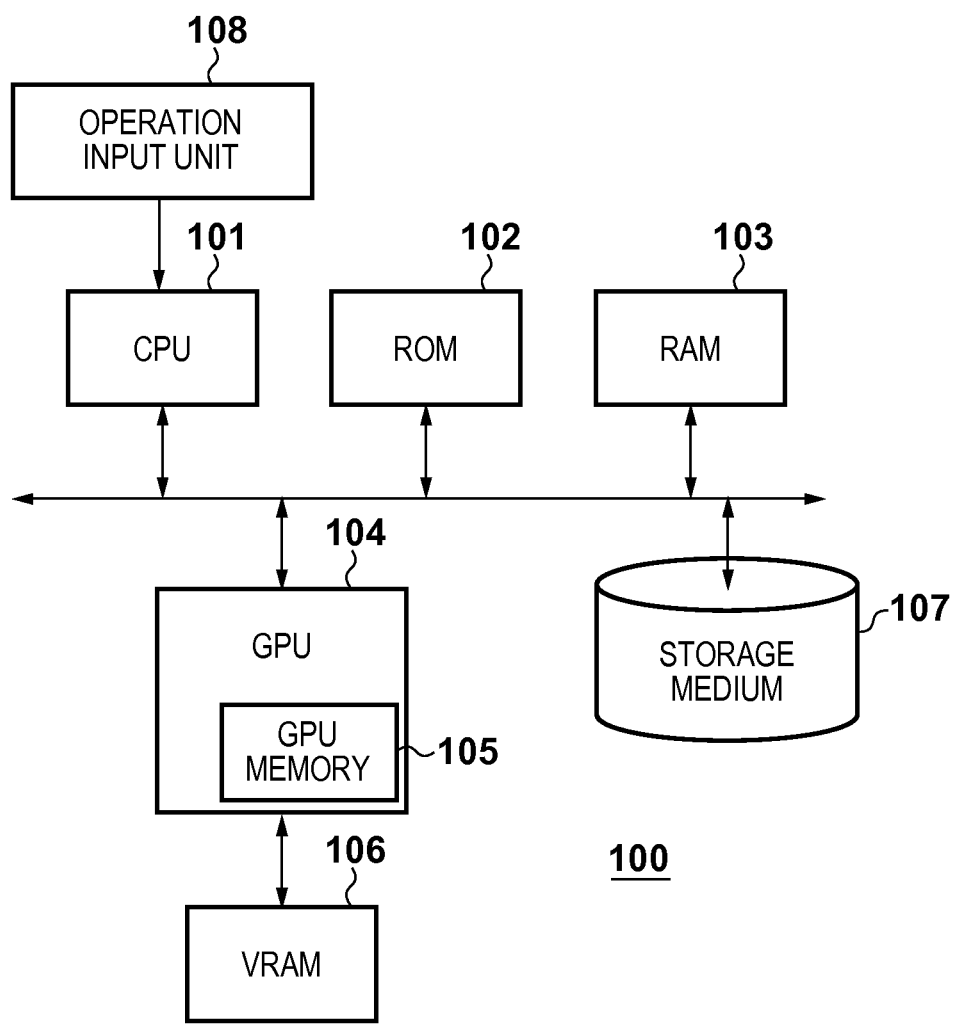
FIG. 1 is a block diagram for showing a functional configuration of a PC 100 according to embodiments of the present invention.

FIG. 1 is a block diagram for showing a functional configuration of a PC 100 according to embodiments of the present invention.

A CPU 101 controls each block that the PC 100 comprises. More specifically, the CPU 101 reads operation programs of the blocks which are stored in a ROM 102, a storage medium 107, or the like, for example, loads the programs into a RAM 103, and executes the programs, thereby controlling operation of the blocks respectively.

The ROM 102 is a rewritable, non-volatile memory. The ROM 102 stores information such as parameters necessary for operation of the PC 100 or operation of the blocks. The RAM 103 is a volatile memory. The RAM 103 is used not only as a loading region of operation programs of the blocks, but also as a storage region for storing temporarily intermediate data output in operation of the blocks.

The GPU 104 performs processing for screen rendering. The GPU 104 has a plurality of the arithmetic cores for performing parallel processing, and executes processing for screen rendering in parallel. For example, in a case where a screen that is rendered is a screen corresponding to a particular viewpoint of a 3D scene, the GPU 104 reads a rendering object included in a rendering scope of the 3D scene from the later described storage medium 107, and loads the rendering object into a GPU memory 105. Then, the GPU 104 executes the computational processing in accordance with a predetermined rendering parameter for the rendering object loaded into the GPU memory 105, and thereby generates (renders) a screen in a connected VRAM 106.

The storage medium 107 is a recording apparatus that is removable, such as an HDD, for example. According to this embodiment, the storage medium 107 records each frame of moving image data which is an encoding target, and encoded moving image data which is encoded by later described encoding processing.

An operation input unit 108 is a user interface connected to the PC 100 such as a mouse, or a keyboard, for example.

When the operation input unit 108 detects that an operation input was performed on a user interface, the operation input unit 108 outputs a corresponding control signal to the CPU 101 thereby notifying it of the operation input.

<Encoding Processing>

Figure 2:
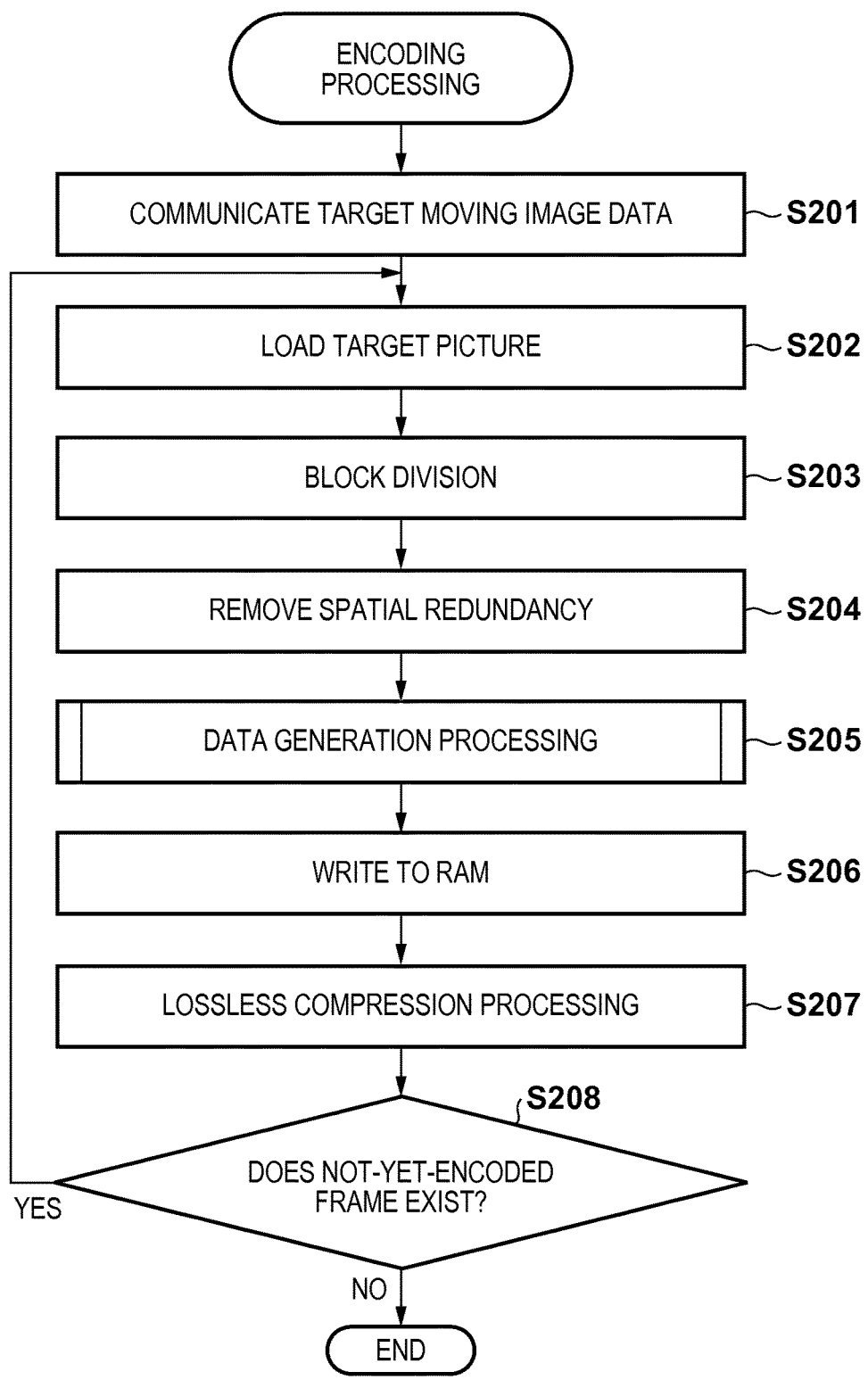
FIG. 2 is a flowchart for exemplifying encoding processing executed by the PC 100 according to embodiments of the present invention.

Using the flowchart of FIG. 2, explanation is given for specific processing for moving image data encoding processing in the PC 100 of the present embodiment which has this kind of configuration. Processing corresponding to this flowchart can be realized by the CPU 101 reading a corresponding processing program stored in the storage medium 107, for example, loading the program into the RAM 103, and executing the program.

Note that this encoding processing is explained as something that is started when the storage medium 107 detects that an encoding start instruction input is performed in an application that performs encoding of moving image data, for example. However, the present invention is not limited to moving image data encoding processing, and it is possible to apply this to still image data encoding processing performed by later described processing steps. Also, the encoding processing explained below does not limit the encoding processing to which the present invention can be applied, and is merely something that conceptually describes processing steps for one exemplary encoding format. In other words, it should be easily understood that the processing steps described in the encoding processing of the present embodiment may be changed as appropriate in accordance with an encoding target, or an encoding format that is used.

In step S201, the CPU 101 communicates information of moving image data of an encoding target (target moving image data) to the GPU 104. The information of the target moving image data may be information of a storage location of a corresponding moving image file stored in the storage medium 107, information by which the GPU 104 can specify data of the encoding target, or the like.

In step S202, the GPU 104 reads an image of a frame (a target picture) for which encoding is performed out of the target moving image data by referring to the information of the target moving image data, and loads the image into the GPU memory 105.

In step S203, the GPU 104 divides the target picture read into the GPU memory 105 into blocks which have a predetermined number of pixels, and are units of execution of the parallel processing. Note that the target picture need not actually be divided into blocks, and blocks may be defined in relation to memory addresses of the GPU memory 105, for example. Also, when an intraframe prediction or an interframe prediction is performed for a target picture, prediction processing is performed for the picture separately from the following parallel processing, though details are not described in the present embodiment.

In step S204, the GPU 104 assigns an arithmetic core of the GPU 104 to each of the blocks. Then the GPU 104 executes orthogonal transformation processing and quantization processing of discrete cosine transformation processing (DCT) in parallel on the blocks, thereby removing a spatial redundancy of the blocks. Note that when the prediction processing is performed, blocks for which a prediction result is reflected become the processing targets of these steps. Also, in order to simplify the explanation in the present embodiment, explanation is given having one arithmetic core of the GPU 104 be assigned to each block, but working of the present invention is not limited to this. Normally, an arithmetic core assignment policy in the GPU 104 depends on a GPU driver; an efficient assignment of, for example, one core for a unit pixel may be performed as appropriate.

In step S205, the GPU 104 executes data generation processing for generating data for outputting from intermediate data for which processing by the GPU 104 in the encoding processing has completed.

In the PC 100 of present embodiment, encoding processing is executed by using the GPU 104 and the CPU 101. In other words, intermediate data in the GPU memory 105 that is processed by the GPU 104 in the steps of the encoding processing must be moved into the RAM 103 to which the CPU 101 can access. However, when the GPU 104 outputs intermediate data to the RAM 103, it is necessary that the intermediate data be transferred via a bus (not shown), and there is a possibility that a transmission bandwidth of the bus will become occupied at this time, and that other processing will be delayed. For example, in the case where the blocks are comprised of 8×8 pixels and each piece of data in a block which is intermediate data is comprised of a 16 bit value, 16 bits×8×8=1024 bits of information is output for one block. In other words, while it depends of the number of pixels of the target picture, data of a capacity corresponding to the number of blocks is transferred for one frame when the intermediate data is output for each of the plurality of the blocks for which parallel processing is performed for optimization.

For this reason, a data conversion is performed in order that it is possible to configure the intermediate data with a smaller amount of information in the data generation processing of the present embodiment. Note that, because the intermediate data is losslessly compressed in variable-length encoding processing as will be explained later, data for outputting is configured such that a data string of the intermediate data is specifiable.

<Data Generation Processing>

Figure 3:
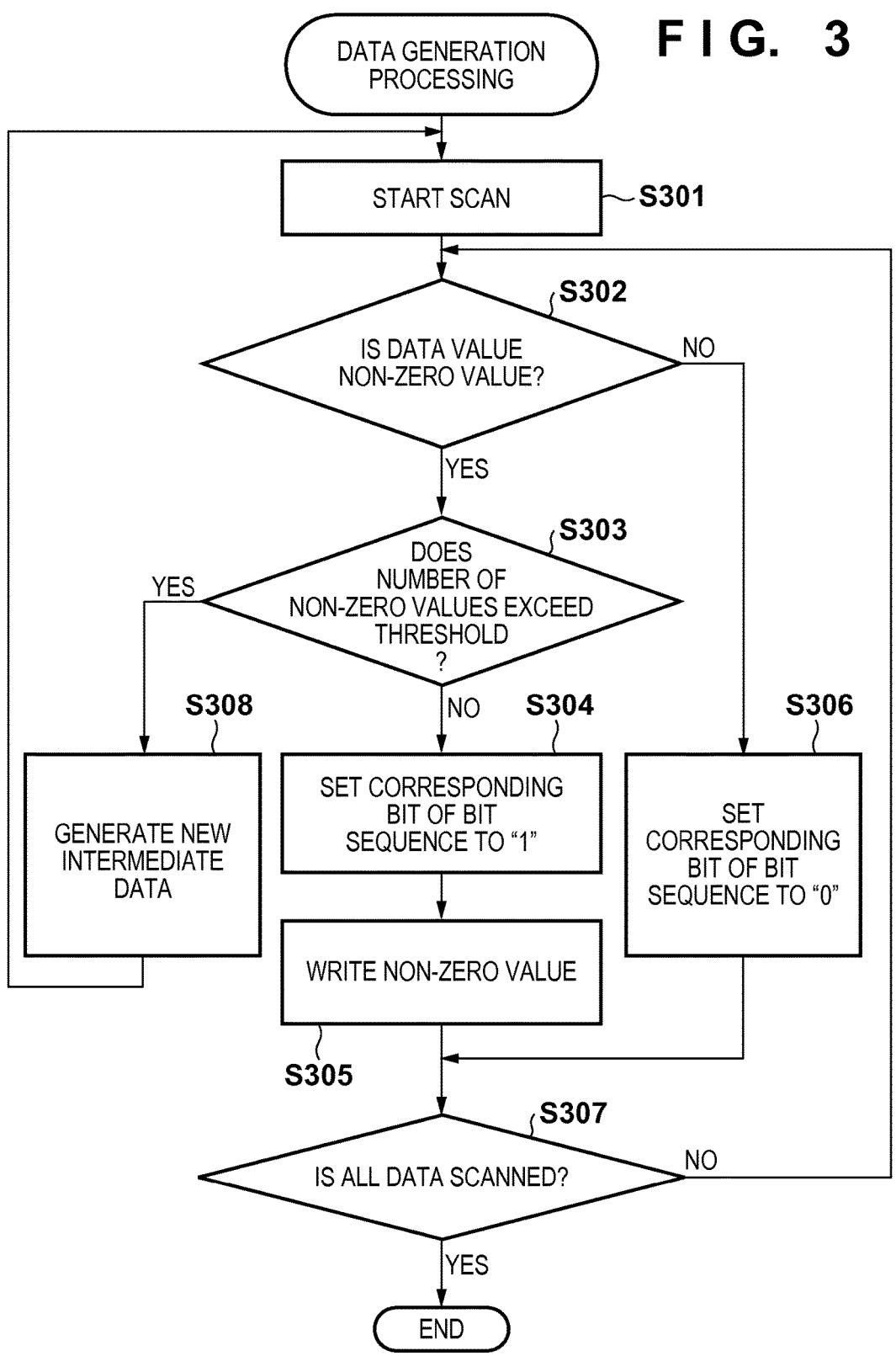
FIG. 3 is a flowchart for exemplifying data generation processing executed by a GPU 104 according to embodiments of the present invention.

Data generation processing executed by the GPU 104 of the present embodiment is described hereinafter in detail using the flowchart of FIG. 3.

Figure 4:
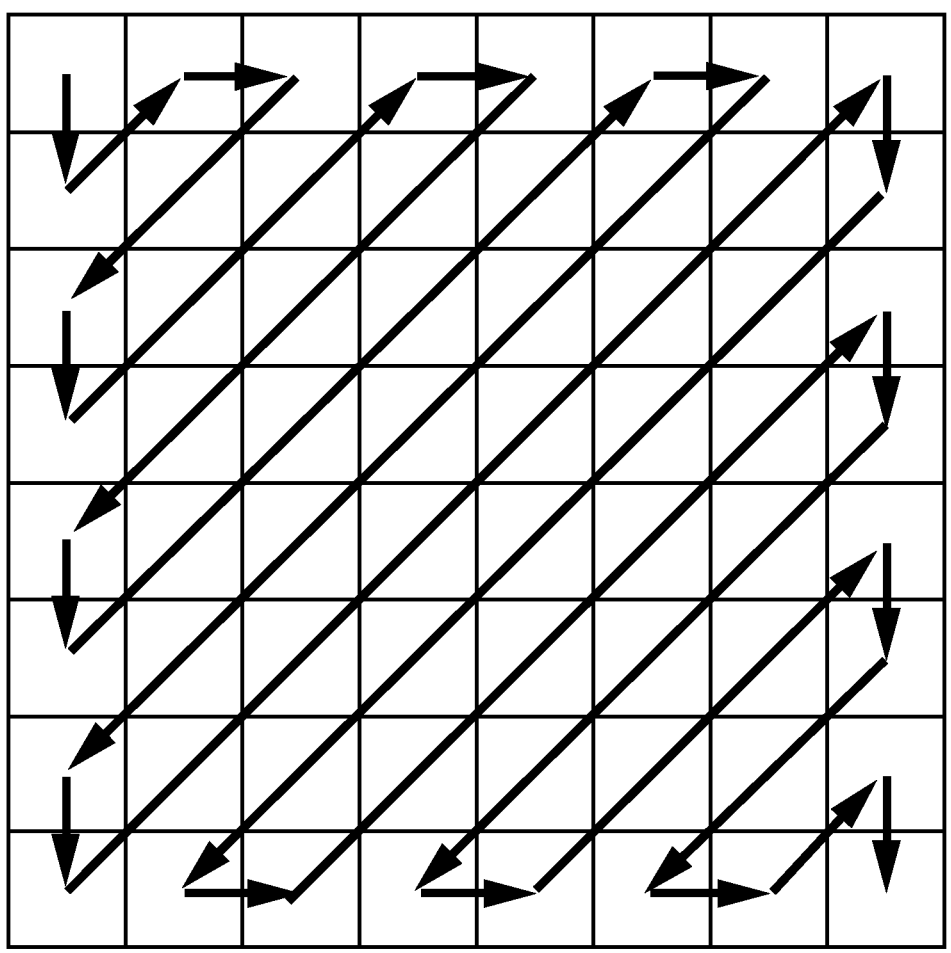
FIG. 4 is a view for illustrating an example of an intermediate data scan order in data generation processing according to embodiments of the present invention.

In step S301, the GPU 104 starts a scan, in an efficient order by which a compression rate of lossless compression of a subsequent stage becomes higher, of data (intermediate data) included in each of the blocks from which a spatial redundancy is removed. Note that the order of the scan in embodiments of the present invention is not limited to this, and, for example, a scan may be performed in an order from lower frequency components (direct current components) to higher frequency components (a so-called zigzag scan), as is shown in FIG. 4, for example, or in another order. Also, in the following explanation, explanation is given of processing on intermediate data corresponding to one block, but this data generation processing may be executed in parallel on a plurality of blocks.

In step S302, the GPU 104 determines whether or not the value of scanned data is a non-zero value. The GPU 104 moves the processing to step S303 in cases where it determines that the value of the scanned data is a non-zero value, and moves the processing to step S306 in cases where it determines that the value is zero.

In step S303, the GPU 104 determines whether or not number scanned data items that are of a non-zero value exceeds a threshold of 28 items.

In encoding processing of the present embodiment, because orthogonal transformation processing and quantization processing, or the like, is performed in parallel for a plurality of blocks in the GPU 104, outputting of data for outputting after the processing is also executed in parallel. In such a case, in order to avoid contention for a write address in the RAM 103 occurring, it is necessary to adjust write start addresses of data for outputting corresponding to respective blocks considering the data size of the data for outputting. Meanwhile, when the CPU 101 reads data of blocks (data for outputting) written to the RAM 103 in order to perform later described lossless compression processing, it is advantageous that read addresses of data of the respective blocks be consecutive. Specifically, because a read out delay may occur due to the occurrence of a pre-charge corresponding to a non-consecutive address change in a data read out from the RAM 103, it is advantageous that the data of each block be written to the RAM 103 in a processing order in the CPU 101.

For this reason, in the data generation processing of the present embodiment, a threshold for the number of data items of a non-zero value included in the intermediate data is arranged as a criterion for a determination that the data for outputting will fall within a fixed data size. In the data generation processing of the present embodiment, the data for outputting that is generated is comprised of a later described bit sequence that indicates whether or not each item of data in the data string is a non-zero value in a block scan order, and the data items which are non-zero values, as shown in FIG. 5. The data for outputting is of a configuration by which it is possible to specify the data string in the scan order of the intermediate data from the 2 types of information that are included. In other words, in this step, the above described determination is performed to avoid the occurrence of contention of a write start address due to the number of data items that are of the latter non-zero value among the data for outputting exceeding the threshold.

The GPU 104 moves the processing to step S308 in cases where it determines that the number of the scanned data items of a non-zero value exceeds the threshold, and moves the processing to step S304 in cases where it determines that the threshold is not exceeded.

In step S304, the GPU 104 sets a corresponding bit of a bit sequence (specifying information) which indicates whether or not one scanned data item is a non-zero value. These may exist in a number equal to the number of data items in the intermediate data for the bit sequence, and in a case where a block is configured by 8×8=64 pixels, for example, the bit sequence can be comprised of a 1 bit× 64=64 bit data string. In this step, the GPU 104 sets a value by selecting a bit of a corresponding position in the order of the scanning of the bits of a 64 bit region reserved in the GPU memory 105 in advance. In other words, by this step and the processing of later described step S306, the bit sequence is of a format where each bit enumerates a value indicating whether or not the data in the intermediate data has a non-zero value in the order of the scanning in order from the leading bit.

In the intermediate data, generally, data whose value is zero exists at a high frequency. In other words, in a case where each data item in the intermediate data is 16 bits, it is necessary for the CPU 101 to read 16 bits of data even if the value of the data is zero. In the PC 100 of the present embodiment, the time required for later described lossless compression processing in the CPU 101 is reduced by reducing the number of times that zeros, which exist at a high frequency, are read out in processing corresponding to the CPU 101 in the later described encoding processing. In other words, in later described lossless compression processing, the CPU 101 is able to grasp information as to whether or not the data items are non-zero values in the data string of the intermediate data, which is re-ordered in the scan order, by reading the bit sequence.

In step S305, the GPU 104 writes scanned data which is of a non-zero value as data that continues from the bit sequence by adding to the reserved region. In other words, because it is possible to eliminate reading of data which is zero in later described lossless compression processing by arranging the bit sequence, only non-zero values to be written to the RAM 103 are added to the subsequent region.

Meanwhile, in a case where it is determined in step S302 that the scanned data item is not a non-zero value, the GPU 104 sets a corresponding bit in the bit sequence to 0 in step S306. Note that it should be easily understood that in the case where the corresponding bit is initialized to 0 in advance, this step is unnecessary.

In step S307, the GPU 104 determines whether or not all of the data included in the intermediate data is scanned. In a case where the GPU 104 determines that all of the data is scanned, the GPU 104 completes the data generation processing, and in a case where the GPU 104 determines that unscanned data exists, the GPU 104 returns the processing to step S302.

In this way, by repeatedly performing the processing of step S304 through step S307, it is possible to generate data for outputting of a data size that is determined in advance. For example, in a case where 8×8=64 data items, each of which has a 16 bit value, exist in the intermediate data as described above, data for outputting can be configured as 64 bits+16 bits×28=512 bits of fixed length data, because it is guaranteed by the processing of step S303 that the number of data items of a non-zero value is not more than 28. In other words, in later described writing to the RAM 103, it is possible to write so that write addresses of data for outputting of a plurality of blocks are consecutive.

Meanwhile, in a case where it is determined that the number of scanned data items that are of a non-zero value exceeds a threshold in step S303, the GPU 104 performs the processing from step S301 for new intermediate data obtained by dividing all of the data of the intermediate data by 2 in step S308. The calculation for dividing by 2 may be a bit shifting computation, for example, and with this it is possible to reduce the number of data items for which the data value is 1 or −1. Note that in a case where the number of data items having a non-zero value in the intermediate data does is not less than or equal to the threshold after only one execution of this step, then the processing of this step may be executed repeatedly. In this way, in the case where an adjustment of the number of items of data is performed, the number of times that this step is executed, i.e. the number of times that the data is divided, may be included distinguishably at a head position of the bit sequence, for example.

Note that it is thought that in the case where the number of items of data having non-zero values in the intermediate data exceeds the threshold, an influence on the image quality is low, and adjustment of the number of data items having non-zero values may be performed by treating data having an absolute data value such as +2, +1, −1, or −2, for example, that is less than or equal to a predetermined threshold as zero data. Also, an approach of treating data for which it is thought that an influence on the image quality is low to be zero may be executed and it is not limited to when the number of data items that are of the non-zero value exceeds the threshold.

In this way, after the data for outputting is generated by executing data generation processing, the GPU 104, in step S206, transfers data for outputting of the blocks generated in the GPU memory 105 to the RAM 103, writing from start addresses corresponding to respective blocks.

In step S207, the CPU 101 reads the data for outputting of the blocks written to the RAM 103, and generates encoded moving image data corresponding to one frame by applying lossless compression processing, referring to the bit sequence in the data. The lossless compression processing performed in this step is so-called entropy encoding (variable-length encoding) processing, such as Huffman coding. The CPU 101 performs compression processing by assigning an appropriate code having specified a configuration of a data string of intermediate data from the data for outputting in the processing of this step.

In step S208, the CPU 101 determines whether or not a different frame for which encoding is not performed exists in the target moving image data. The CPU 101 moves the processing to step S202 in cases where it determines that a subsequent frame for which encoding is not performed exists in the target moving image data, and completes the encoding processing in a case where it determines that no such frame exists. Note that the determination in this step is only one example, and in a case where processing of the GPU 104 and the CPU 101, for example, is performed in parallel respectively, the processing of the GPU 104 for the next frame may be already started when this step is executed. Configuration may be taken such that the CPU 101, in such a case, does not move the processing to step S202, but rather stands by until the processing corresponding to the GPU 104 in the encoding processing completes, and then executes the processing of step S207.

Note that explanation was given for one preferred embodiment for reducing the time required for reading a memory of the CPU 101 while avoiding a monopolization of the transmission bandwidth of the bus in the PC 100 in the present embodiment. However, optimization of encoding processing that can be realized using the CPU and the GPU is not limited to this. For example, in a case where the transmission bandwidth of the bus is wide and problems do not arise in data transfer, data for outputting that continues from the bit sequence may include not only data of non-zero values, but rather all of the data of the intermediate data. In other words, if the CPU 101 can grasp the bit sequence indicating the information as to whether or not the data items are non-zero values, it is able to grasp the addresses of zero data which need not be read, and therefore it is possible to reduce the time required for reading memory. Also, for example, if a position in a data string of the intermediate data of data for which the value is included in a predetermined range (a range in which the value may be treated as zero) can be identified, it is possible to reduce the processing time corresponding to a memory read, at least. For this reason, information having a format that is different to a bit sequence may be written to the RAM 103.

Furthermore, explanation was given for separating the steps of the encoding processing and executing them in accordance with characteristics of processing which can be executed efficiently on the CPU 101 and the GPU 104 respectively in the present embodiment. More specifically, processing, in which a simple computation that is executable by a predetermined arithmetic equation can be executed in parallel (processing for eliminating a spatial redundancy) for a plurality of blocks, is assigned to the GPU 104 for which parallel calculation is a strong point. Also, processing for which parallel execution is difficult due to post-compression data size fluctuation (lossless compression processing) is assigned to the CPU 101 for which complicated bit computation such as bit analysis is a strong point. In other words, configuration is taken such that as much as possible processing for performing a computation is not assigned to the GPU 104 which requires processing time for complicated bit computation, and that as much as possible processing for performing parallel computing is not assigned to the CPU 101 for which optimization due to parallel processing is not anticipated because it has few arithmetic cores. However, for embodiments of the present invention, optimization of encoding processing is anticipated even when not executing processes having divided them in accordance with characteristics of the CPU 101 and the GPU 104. For example, data for which run length encoding of the intermediate data is performed may be written into the RAM 103 as data for outputting in the GPU 104 when optimization due to parallel computing is anticipated compared to the time required for bit computation in the GPU 104. With this, on top of reducing the time for the CPU 101 to read memory, it is possible to reduce the processing time for lossless compression. In other words, in processing by the CPU 101, optimization of encoding processing can be realized even by the GPU 104 generating data for outputting which can shorten a read time to be less than a time corresponding to a memory read of the intermediate data itself.

As explained above, an information processing apparatus of the present embodiment is able to optimize encoding processing by using a CPU and a GPU. More specifically, in the information processing apparatus, the GPU obtains a plurality of blocks which have a predetermined number of pixels and are obtained by dividing an encoding target image, and intermediate blocks for which a spatial redundancy is removed are generated for each block. In addition, the GPU analyzes the data string of the intermediate blocks, and generates specifying information for specifying positions of data for which a value is included in a predetermined range in the data string, and for each of the blocks, outputs at least a portion of the data of the intermediate blocks, and corresponding specifying information to a storage apparatus. Also, the CPU, for each of the plurality of blocks, executes compression processing by referencing corresponding specifying information, and reading at least a portion of the data corresponding to the specifying information from the storage apparatus.

Other Embodiments

The information processing apparatus according to the present invention can be realized by a program for causing a computer to function as an information processing apparatus. The program can be provided/distributed by being recorded on a computer-readable storage medium, or through an electronic communication line.

The present invention is not limited to the above embodiments and various changes and modifications can be made within the spirit and scope of the present invention. Therefore, to apprise the public of the scope of the present invention, the following claims are made.

What is claims is:

1. An information processing apparatus having a central processing unit (a CPU) and a graphics processing unit (a GPU), and operable to encode an image, wherein
the GPU is configured to:
obtain a plurality of blocks having a predetermined number of pixels obtained by dividing an encoding target image; and
for each of the plurality of blocks:
generate an intermediate block for which a spatial redundancy is removed;
analyze a data string of the intermediate block;
generate specifying information corresponding to the intermediate block, the specifying information specifying a position of data for which a value is included in a predetermined range in the data string; and
output, to a memory, at least a portion of data of the intermediate block and the corresponding specifying information, and
the CPU is configured to:
for each of the plurality of blocks:
read the corresponding specifying information of the intermediate block from the memory;
execute compression processing, by referencing the specifying information; and
read the at least a portion of the data corresponding to the specifying information from the memory, wherein
for each of the intermediate blocks, when a number of data items that are included in a data string and for which a value is included in the predetermined range is larger than a predetermined number,
the GPU generates specifying information for a new data string obtained by dividing a value indicated by each of the data items of the data string by a predetermined value, and
the GPU orders in a data string order, and outputs as the at least a portion of the data, only data that is included in the new data string and for which a value is included in the predetermined range.

2. The information processing apparatus according to claim 1, wherein the GPU includes, in the specifying information, a number of times to divide the value indicated by each of the data items of the data string of the by a predetermined value.

3. An information processing apparatus having a central processing unit (a CPU) and a graphics processing unit (a GPU), and operable to encode an image, wherein
the GPU is configured to:
obtain a plurality of blocks having a predetermined number of pixels obtained by dividing an encoding target image; and
for each of the plurality of blocks:
generate an intermediate block for which a spatial redundancy is removed;
analyze a data string of the intermediate block;
generate specifying information corresponding to the intermediate block, the specifying information specifying a position of data for which a value is included in a predetermined range in the data string; and
output, to a memory, at least a portion of data of the intermediate block and the corresponding specifying information, and
the CPU is configured to:
for each of the plurality of blocks:
read the corresponding specifying information of the intermediate block from the memory;
execute compression processing, by referencing the specifying information; and
read the at least a portion of the data corresponding to the specifying information from the memory, wherein
for each of the intermediate blocks, when a number of data items that are included in a data string and for which a value is included in the predetermined range is larger than a predetermined number,
the GPU generates specifying information for a new data string obtained by changing a portion of data, among the data for which a value is included in the predetermined range, to have a value outside of the predetermined range, and the GPU orders in a data string order, and outputs as the at least a portion of the data, only data that is included in the new data string and for which a value is included in the predetermined range.

4. The information processing apparatus according to claim 3, wherein the GPU, for each intermediate block, changes data of a value for which it is predetermined that an influence on an image quality is low to have a value outside of the predetermined range when the number of data items included in the data string and for which the value is included in the predetermined range is larger than the predetermined number.

5. The information processing apparatus according to claim 1, wherein for each intermediate block, the GPU orders in a data string order, and outputs as the at least a portion of the data, only data that is included in the new data string and for which a value is included in the predetermined range.

6. The information processing apparatus according to claim 1, wherein for each intermediate block, the GPU generates the specifying information by ordering in a data string order information as to whether or not a value of each of the data items in the data string is included in the predetermined range.

7. The information processing apparatus according to claim 1, wherein the data for which the value is included in the predetermined range is data for which a data value is a non-zero value from the data string of the intermediate blocks.

8. The information processing apparatus according to claim 1, wherein the data for which the value is included in the predetermined range is data predetermined to have an influence on an image quality from the data string of the intermediate blocks.

9. The information processing apparatus according to claim 1, wherein the GPU is further configured to:
perform an orthogonal transformation on each of the plurality of blocks;
quantize each of the plurality of blocks for which the orthogonal transformation is performed; and
generate the data string of the intermediate blocks by ordering in a predetermined order data corresponding to pixels for each of the plurality of blocks quantized,
wherein the CPU losslessly compresses the data string of the intermediate blocks, which are specified from the specifying information and the at least a portion of the data.

10. A method of controlling an information processing apparatus having a central processing unit (CPU) and a graphics processing unit (GPU), and operable to encode an image, the method comprising:
obtaining a plurality of blocks having a predetermined number of pixels, the plurality of blocks being obtained by dividing an encoding target image;
for each of the plurality of blocks
generating an intermediate block for which a spatial redundancy is removed;
analyzing a data string of the intermediate block;
generating specifying information corresponding to the intermediate block, the specifying information specifying a position of data for which a value is included in a predetermined range in the data string;
outputting, to a memory, at least a portion of data of the intermediate block and the corresponding specifying information;
reading the corresponding specifying information of the intermediate block from the memory;
executing compression processing, by referencing the specifying information; and
reading the at least a portion of the data corresponding to the specifying information from the memory, wherein
for each of the intermediate blocks, when a number of data items that are included in the data string and for which the value is included in the predetermined range is larger than a predetermined number:
the GPU, in the analyzing, generates specifying information for a new data string obtained by dividing a value indicated by each of the data items of the data string by a predetermined value, and
the GPU, in the outputting, orders in a data string order, and outputs as the at least a portion of the data, only data that is included in the new data string and for which the value is included in the predetermined range.

11. A non-transitory computer-readable storage medium recording a program for causing a computer to function as the information processing apparatus according to claim 1.

12. A method of controlling an information processing apparatus having a central processing unit (CPU) and a graphics processing unit (GPU), and operable to encode an image, the method comprising:
obtaining a plurality of blocks having a predetermined number of pixels, the plurality of blocks being obtained by dividing an encoding target image;
for each of the plurality of blocks:
generating an intermediate block for which a spatial redundancy is removed;
analyzing a data string of the intermediate block;
generating specifying information corresponding to the intermediate block, the specifying information specifying a position of data for which a value is included in a predetermined range in the data string;
outputting, to a memory, at least a portion of data of the intermediate block and the corresponding specifying information;
reading the corresponding specifying information of the intermediate block from the memory;
executing compression processing, by referencing the specifying information; and
reading the at least a portion of the data corresponding to the specifying information from the memory, wherein
for each of the intermediate blocks, when a number of data items that are included in the data string and for which the value is included in the predetermined range is larger than a predetermined number:
the GPU, in the analyzing, generates specifying information for a new data string obtained by changing a portion of data, among the data for which the value is included in the predetermined range, to have a value outside of the predetermined range, and
the GPU, in the outputting, orders in a data string order, and outputs as the at least a portion of the data, only data that is included in the new data string and for which the value is included in the predetermined range.

13. The information processing apparatus according to claim 1, wherein the generating of the intermediate block includes:
    scanning the plurality of blocks to detect non-zero values in its data, and
    generating intermediate data when a number of the non-zero values exceed a predetermined threshold to remove spatial redundancies.

* * * * *

UNITED STATES PATENT AND TRADEMARK OFFICE
CERTIFICATE OF CORRECTION

PATENT NO. : 9,769,486 B2
APPLICATION NO. : 14/868871
DATED : September 19, 2017
INVENTOR(S) : T. Iwasaki It is certified that error appears in the above-identified patent and that said Letters Patent is hereby corrected as shown below:

In the Claims

At Column 10, Line 34 (Claim 2, Line 4), please change "string of the by" to -- string by --.

At Column 11, Line 18 (Claim 5, Line 2), please change "wherein" to -- wherein, --.

At Column 11, Line 24 (Claim 6, Line 2), please change "wherein" to -- wherein, --.

Signed and Sealed this
Twenty-seventh Day of February, 2018

Andrei Iancu
*Director of the United States Patent and Trademark Office*